(12) United States Patent
Ismail

(10) Patent No.: US 9,575,920 B2
(45) Date of Patent: Feb. 21, 2017

(54) METHOD FOR TRANSMITTING A PROCESS MAP VIA A GATEWAY DEVICE

(71) Applicant: ABB AG, Mannheim (DE)

(72) Inventor: Muhamad-Ikhwan Ismail, Erlangen (DE)

(73) Assignee: ABB AG, Mannheim (DE)

( * ) Notice: Subject to any disclaimer, the term of this patent is extended or adjusted under 35 U.S.C. 154(b) by 208 days.

(21) Appl. No.: 14/134,336

(22) Filed: Dec. 19, 2013

(65) Prior Publication Data

US 2014/0108685 A1   Apr. 17, 2014

Related U.S. Application Data

(63) Continuation of application No. PCT/EP2012/002821, filed on Jul. 5, 2012.

(30) Foreign Application Priority Data

Jul. 6, 2011   (DE) .................. 10 2011 107 323

(51) Int. Cl.
  *G06F 13/24*   (2006.01)
  *G06F 13/40*   (2006.01)
  (Continued)

(52) U.S. Cl.
  CPC ........... *G06F 13/42* (2013.01); *G05B 19/0423* (2013.01); *G05B 2219/21018* (2013.01); *G05B 2219/31348* (2013.01)

(58) Field of Classification Search
  USPC ........................................ 710/260, 307, 315
  See application file for complete search history.

(56) References Cited

U.S. PATENT DOCUMENTS

| | | | | | |
|---|---|---|---|---|---|
| 5,072,358 | A | * | 12/1991 | Lankford | ............... G05B 21/02 341/110 |
| 5,400,331 | A | * | 3/1995 | Lucak | .................... H04L 29/06 370/401 |

(Continued)

FOREIGN PATENT DOCUMENTS

| DE | 10 007 597 A1 | 8/2001 |
|---|---|---|
| DE | 10 2005 051 580 A | 5/2007 |

(Continued)

OTHER PUBLICATIONS

International Search Report (PCT/ISA/210) mailed on Oct. 23, 2012 by the European Patent Office as the International Searching Authority for International Application No. PCT/EP2012/002821.

(Continued)

*Primary Examiner* — Faisal M Zaman
(74) *Attorney, Agent, or Firm* — Taft Stettinius & Hollister LLP

(57) ABSTRACT

Exemplary methods and systems are directed to transmitting a process map of a control or automation system via a gateway device. The gateway device includes at least one first functional unit connected to a higher-ranking control unit via a first communications link based on a primary field bus protocol, and at least one second functional unit connected to at least one field device via a second communications link based on a secondary field bus protocol. Binary signals are stored in corresponding registers and analog signals, which are in an integer format, are transmitted to the first functional unit such that the number of binary signals is reduced by packing the binary signals into data bytes. The data bytes are translated into corresponding telegrams that can be processed by the primary field bus protocol and with the analog signals are transmitted to the higher-ranking control unit.

20 Claims, 1 Drawing Sheet

(51) Int. Cl.
*G06F 13/36* (2006.01)
*G06F 13/42* (2006.01)
*G05B 19/042* (2006.01)

(56) References Cited

U.S. PATENT DOCUMENTS

| | | | | |
|---|---|---|---|---|
| 6,463,338 | B1* | 10/2002 | Neet | G05B 19/042 340/3.71 |
| 8,761,196 | B2* | 6/2014 | Law | G05B 19/4186 370/464 |
| 9,274,993 | B2* | 3/2016 | Beyer | G06F 13/4036 |
| 2003/0035409 | A1* | 2/2003 | Wang | H04L 29/06 370/349 |
| 2003/0081589 | A1* | 5/2003 | Marian | H04L 45/02 370/351 |
| 2003/0099229 | A1 | 5/2003 | Tretter et al. | |
| 2004/0215354 | A1 | 10/2004 | Nakamura et al. | |
| 2005/0119854 | A1 | 6/2005 | Maier et al. | |
| 2006/0080675 | A1* | 4/2006 | Franchuk | G05B 19/4148 719/318 |
| 2007/0100995 | A1 | 5/2007 | Isenmann et al. | |
| 2007/0280144 | A1 | 12/2007 | Hodson et al. | |
| 2008/0167758 | A1 | 7/2008 | Louch et al. | |
| 2010/0135311 | A1 | 6/2010 | Schneider et al. | |
| 2012/0246376 | A1 | 9/2012 | Kolblin et al. | |

FOREIGN PATENT DOCUMENTS

| | | |
|---|---|---|
| DE | 10 2008 058 033 A1 | 5/2010 |
| DE | 10 2009 045 386 A1 | 4/2011 |
| EP | 1 406 134 A1 | 4/2004 |
| WO | WO 2007/102779 A1 | 9/2007 |

OTHER PUBLICATIONS

German Search Report issued on Dec. 30, 2011.

* cited by examiner

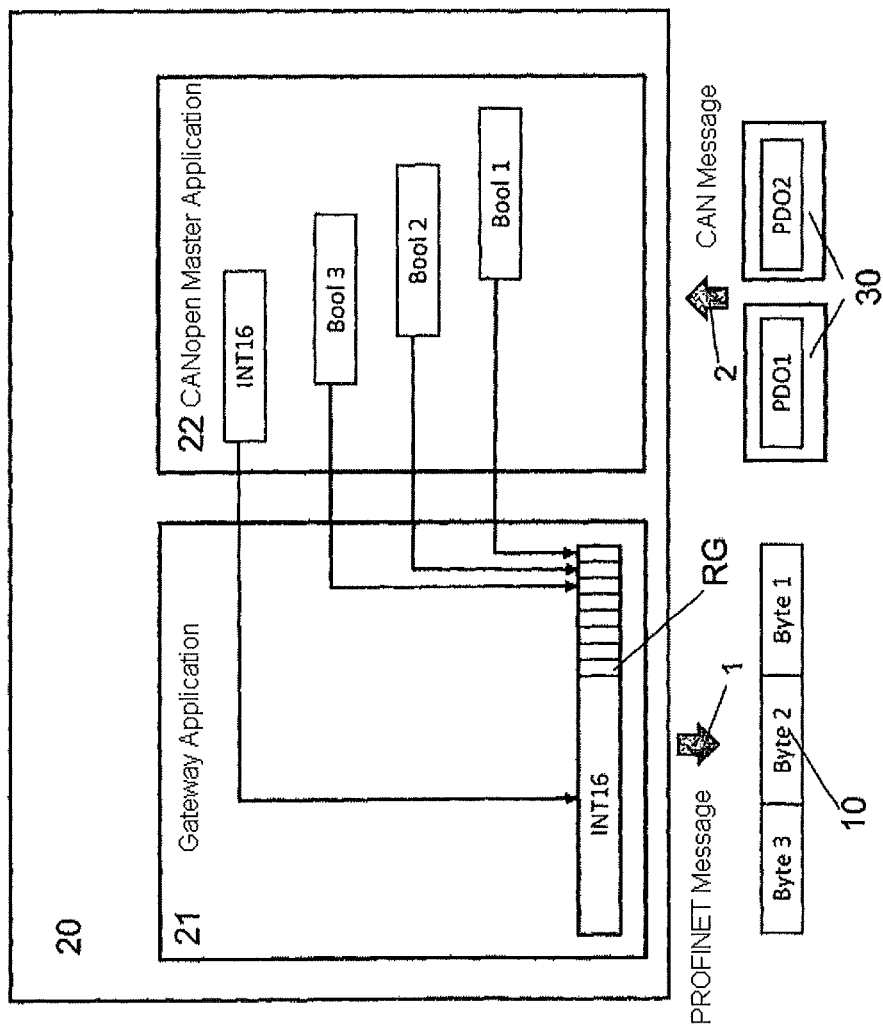

METHOD FOR TRANSMITTING A PROCESS MAP VIA A GATEWAY DEVICE

RELATED APPLICATION(S)

This application claims priority under 35 U.S.C. §120 to International application PCT/EP2012/002821 filed on Jul. 5, 2012, designating the U.S., and claiming priority to German application 10 2011 107 323.3 filed in Germany on Jul. 6, 2011. The content of each prior application is hereby incorporated by reference in its entirety.

FIELD

The disclosure relates to a system and method for transmitting a process map via a gateway device which allows possible for field buses of different protocols to communicate.

BACKGROUND INFORMATION

Known automation or control systems for controlling a technical process or a technical installation can include a central or superordinate unit, for example a programmable logic controller (PLC) or a process control system (PCS). The central control unit communicates with the field devices of the automation system via a communication interface module (also called gateway device). In this case, the gateway device makes it possible for field buses of different protocols to communicate. For communication between field bus systems which process different protocols, the gateway device communicates with the central control unit using a Profinet protocol, for example, and communicates with input/output devices and/or field devices connected thereto via a field bus protocol, for example CAN or CANopen.

Different field devices can be used to record and/or influence process variables which are, for example, current measured values provided by sensors. The recorded current measured values are transmitted according to the prior art in the form of so-called process data objects from the field level to the gateway device using a field bus protocol having a low transmission rate of 1.2 Kbit/s, for example, and are forwarded from the gateway device to the superordinate control unit via a high-speed Ethernet bus. The process data objects are used to transport real-time data.

Process control is usually effected by the control unit, where the measured values from different field devices are evaluated and control signals for actuators connected to the automation system are generated based on the evaluation. In addition to purely transmitting measured values, field devices may also transmit additional information, such as diagnostic and status information, to the superordinate control unit. The field devices are likewise parameterized and configured via the bus system or network of the control or automation system. In this case, signals can be transmitted between the field device and the control unit in analog or digital form as binary code (Boolean value) or an integer value.

In gateway devices, according to the prior art, the process map of the installation, which was transmitted in the form of process data objects to the gateway device using a secondary field bus protocol with a low transmission rate, is first of all mapped as a secondary network variable in binary format in the gateway device and is converted into a primary network variable which is in byte format and can then be transmitted to the superordinate control unit using the primary high-speed Ethernet bus protocol.

However, this method specifies a wide bandwidth and burdens the data traffic on the primary high-speed Ethernet bus since seven bits of overhead should be provided for each bit, in which case overhead should be understood as meaning data which do not primarily belong to the useful data but rather are specified as additional information for transmission or storage.

A CANopen communication protocol may transmit, for example, only 1028 binary signals corresponding to approximately 130 bytes (=128.5 bytes), which limits the upper limit of the process data size for a device connected to the Profinet bus to 1028 bytes. The number of items of information which can be transmitted is therefore restricted by the limited message size which can be transmitted using the primary network protocol.

SUMMARY

An exemplary method for transmitting a process map of a control or automation system via a gateway device is disclosed, the gateway including at least one first functional unit, to which a superordinate control unit is connected via a first communications link based on a primary field bus protocol, and at least one second functional unit, to which at least one field device is connected via a second communications link based on a secondary field bus protocol, the method comprising: transmitting process variables, which are provided by the field devices, as process data objects based on the secondary field bus protocol, wherein the process variables are transmitted as messages to the second functional unit of the gateway device; allocating corresponding registers in a binary format to the process data objects in a form of digital signals; allocating corresponding addresses in an integer format to the process data objects in a form of analog signals; and transmitting the digital signals stored in the corresponding registers and the analog signals in the integer format to the first functional unit such that the number of binary signals is reduced by packing the binary signals into respective data bytes, the binary signals are translated into corresponding messages which can be processed by the primary field bus protocol, and are transmitted, together with the analog signals in the integer format, to the superordinate control unit based on the primary field bus protocol.

An exemplary method for transmitting a process map of a control or automation system via a gateway device is disclosed, the gateway including at least one first functional unit, to which a superordinate control unit is connected via a first communications link based on a primary field bus protocol, and at least one second functional unit, to which at least one field device is connected via a second communications link based on a secondary field bus protocol, the method comprising: transmitting the process variables provided by the superordinate unit as process data objects based on the primary field bus protocol to the first functional unit of the gateway device, as messages in a byte format which can be processed by the primary field bus protocol; generating eight binary signals from each byte and storing the binary signals in a corresponding register address of the first functional unit; entering the signals in integer format from the superordinate unit in a register address; transmitting the binary signals stored in the corresponding registers, and the analog signals in integer format to the second functional unit operating as a task master; and transmitting the binary signals into corresponding messages which can be processed by the secondary field bus protocol and transmitted, together with the analog signals in integer format, to corresponding field devices based on the secondary field bus protocol.

An exemplary system for transmitting a process map of a control or automation system is disclosed, the system comprising: a gateway device including at least one first functional unit, to which a superordinate control unit is connected via a first communications link based on a primary field bus protocol, and at least one second functional unit, to which at least one field device is connected via a second communications link based on a secondary field bus protocol; wherein the second functional unit of the gateway device, which operates as a task master, receives process variables provided by the field devices as process data objects based on the secondary field bus protocol as messages, wherein registers provided in the second functional unit are allocated to the process data objects which are in the form of digital signals and are in binary format, wherein the digital signals stored in the corresponding registers are packed as binary signals into data blocks of eight bits each, stored in the first functional unit operating as a task gateway, and translated into corresponding messages which can be processed by the primary field bus protocol and can be transmitted, together with the analog signals in integer format, to the superordinate control unit based on the primary field bus protocol.

An exemplary automation control system is disclosed, comprising: a gateway device including at least one first functional unit, to which a superordinate control unit is connected via a first communications link based on a primary field bus protocol, and at least one second functional unit, to which at least one field device is connected via a second communications link based on a secondary field bus protocol, wherein the second functional unit of the gateway device, which operates as a task master, receives process variables provided by the field devices as process data objects based on the secondary field bus protocol as messages, wherein registers provided in the second functional unit are allocated to the process data objects which are in the form of digital signals and are in binary format, and wherein the digital signals stored in the corresponding registers are packed as binary signals into data blocks of eight bits each, stored in the first functional unit operating as a task gateway, and translated into corresponding messages which can be processed by the primary field bus protocol and can be transmitted, together with the analog signals in integer format, to the superordinate control unit based on the primary field bus protocol.

BRIEF DESCRIPTION OF THE DRAWINGS

The disclosure as well as advantageous refinements, improvements and further advantages of the disclosure shall be described and explained in more detail using the exemplary embodiment illustrated in the following figure.

In the drawing:

FIG. 1 shows a portion of a control system for transmitting a process image via a gateway device in accordance with an exemplary embodiment of the present disclosure.

DETAILED DESCRIPTION

Exemplary embodiments of the present disclosure specify a novel method for transmitting a process map via a gateway device, as a result of which the ability of field buses of different protocols to communicate is improved and, for example, the number of items of information which can be transmitted between a primary first communications link, which is connected to a superordinate unit and is based on a primary field bus protocol, via the gateway device, and a second communications link, which is based on a secondary field bus protocol and has field devices connected to the second communications link, is increased.

Exemplary embodiments of the present disclosure further provide a method for transmitting a process map of a control or automation system via a gateway device including at least one first functional unit, which enables connection to a superordinate control unit, for example a programmable logic controller, via a first communications link based on a primary field bus protocol, and at least one second functional unit, which enables connection of field devices via a second communications link based on a secondary field bus protocol.

A standardized real-time field bus, for example Profinet I/O, which is based on the full-duplex fast Ethernet technology for automation is provided as the primary field bus protocol. In this case, Profinet IO makes it possible to connect decentralized peripherals, for example input/output devices, to a central controller and supports applications with bus cycle times of up to 10 ms.

An exemplary embodiment of the present disclosure is directed to a method gateway device for carrying out the method are intended for use in automation or control systems of process automation or machine control.

The exemplary method according to embodiments of the present disclosure is used for transmitting a process map of a control or automation system via a gateway device starts from the fact that the number of binary signals which are transmitted is increased by packing a plurality of binary signals into data blocks of eight bits each.

In accordance with the exemplary method disclosed herein, the gateway device carries out the following method steps.

Process variables provided by the field devices can be first transmitted as process data objects based on the secondary field bus protocol to the second functional unit of the gateway device, which operates as a task master, as messages, and corresponding registers in a binary format are allocated to the process data objects in the form of digital signals. The registers form register addresses organized in the second functional unit. Corresponding addresses in integer format can be allocated, in the first functional unit of the gateway device, to the process data objects in the form of analog signals transmitted from the field devices via the second communications link.

The binary signals stored in the corresponding registers and the analog signals in integer format are then transmitted to the first functional unit operating as a task gateway in such a manner that the number of binary signals is reduced by packing the binary signals into data blocks of eight bits each which now respectively form a byte and are translated into corresponding messages which can be processed by the primary field bus protocol and are transmitted, together with the analog signals in integer format, to the superordinate control unit based on the primary field bus protocol.

The gateway device converts the variable of the secondary network in binary code directly into a format which is understood by the primary network by eliminating all overhead data by packing the variables consisting of a plurality of bits into one byte, for example, by packing a plurality of binary signals into data blocks of eight bits each=1 byte. In addition, at least one primary network variable which is in byte format and was formed from a variable in binary format is shifted into a so-called secure view.

An exemplary method according to the disclosure can therefore be used to carry out compressed mapping of a process data map between a primary network and a secondary network via a gateway device.

According to an exemplary embodiment of the present disclosure in executing the method, the gateway device communicates with the superordinate unit via a high-performance (high-speed) Ethernet, Profinet or Profibus protocol and communicates with the field devices via the CAN or CANopen field bus protocol.

Consequently, the gateway device is responsible for converting all Profinet-compatible inputs and outputs from the superordinate unit into a CANopen-compatible format and vice versa.

The exemplary method according to the present disclosure can therefore also be carried out in the reverse order, which is described below.

The process variables provided by the superordinate unit are first of all transmitted as process data objects based on the primary field bus protocol to the first functional unit of the gateway device, which operates as a task gateway, as messages in byte format which can be processed by the primary field bus protocol, and eight binary signals are generated from each byte and are stored in the corresponding register address of the first functional unit. The signals in integer format from the superordinate unit can likewise be entered in a register address.

The binary signals stored in the corresponding registers and the analog signals in integer format can be transmitted to the second functional unit operating as a task master, and are translated into corresponding messages which can be processed by the secondary field bus protocol and are transmitted, together with the analog signals in integer format, to the corresponding field devices based on the secondary field bus protocol.

Exemplary embodiments of the present disclosure also relate to a system which is intended to carry out the method according to the disclosure.

The exemplary system according to the present disclosure is configured for transmitting a process map of a control or automation system via a gateway device includes at least one first functional unit, to which a superordinate control unit is connected via a first communications link based on a primary field bus protocol, and at least one second functional unit, to which at least one field device is connected via a second communications link based on a secondary field bus protocol. The gateway device therefore makes it possible for field buses of different protocols to communicate, and is intended to transmit a process image of a control or automation system.

The gateway device has the function of a slave with respect to the superordinate unit at the superordinate level and has the function of a master with respect to the field devices at the field level, the gateway device undertaking communication between the field devices connected thereto and the superordinate control unit using the primary high-performance communications link in the form of a master connection, and undertaking communication between the field devices connected to the secondary bus via the second communications link which is integrated in the communication interface module and is in the form of a slave connection.

The gateway device receives the process variables provided by the field device as process data objects based on the secondary field bus protocol using the second functional unit integrated in the gateway device.

The second functional unit of the gateway device contains registers to which the process data objects which are in the form of digital signals and are in binary format are allocated.

Corresponding addresses in integer format are allocated to the process data objects in the form of analog signals.

The binary signals stored in the corresponding registers are packed as binary signals into data blocks of eight bits each, are stored in the first functional unit operating as a task gateway, and are translated into corresponding messages which can be processed by the primary field bus protocol and can be transmitted, together with the analog signals in integer format, to the superordinate control unit based on the primary field bus protocol.

The gateway device 20, as illustrated in FIG. 1, makes it possible for field buses 1, 2 of different protocols, for example Profinet and CAN or CANopen, to communicate. The gateway device 20 includes a first functional unit 21, which handles communication with a superordinate programmable logic controller via the Profinet field bus protocol 1, and a second functional unit 22 for communicating with CAN-compatible or CANopen-compatible operating field devices 30 connected thereto via the CAN or CANopen field bus protocol 2.

The process variables provided by the field devices 30 can be transmitted as process data objects PDO1, PDO2 based on the CANopen field bus protocol 2 to the second functional unit 22 of the gateway device 20, which operates as a task master, as CAN messages.

Corresponding registers Bool1, Bool2, Bool3 in binary format can be allocated to the process data objects PDO1, PDO2 in the form of digital signals. Corresponding addresses in integer format INT16 are allocated to the process data objects PDO1, PDO2 in the form of analog signals.

The binary signals stored in the corresponding registers Bool1, Bool2, Bool3 and the analog signals in integer format INT16 can be transmitted to the first functional unit 21 operating as a task gateway in such a manner that the number of binary signals is reduced by packing the binary signals into data blocks of eight bits each, which now respectively form a byte and are translated into corresponding Profinet messages which can be processed by the Profinet field bus protocol 1 and are transmitted, together with the analog signals in integer format INT16, to the superordinate control unit based on the Profinet field bus protocol 1.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for transmitting a process map of a control or automation system via a gateway device including at least one first functional unit, to which a superordinate control unit is connected via a first communications link based on a primary field bus protocol, and at least one second functional unit, to which at least one field device is connected via a second communications link based on a secondary field bus protocol, the method comprising:

transmitting process variables, which are provided by the field devices, as process data objects based on the secondary field bus protocol, wherein the process variables are transmitted as messages to the second functional unit of the gateway device;

allocating corresponding registers in a binary format to the process data objects in a form of digital signals;

allocating corresponding addresses in an integer format to the process data objects in a form of analog signals; and transmitting the digital signals stored in the corresponding registers and the analog signals in the integer format to the first functional unit such that the number of binary signals is reduced by packing the binary signals into respective data bytes with no overhead for each data bit, the binary signals are translated into corresponding messages which can be processed by the primary field bus protocol, and are transmitted, together with the analog signals in the integer format, to the superordinate control unit based on the primary field bus protocol.

2. The method as claimed in claim 1, wherein the first function unit is configured to operate as a task gateway.

3. The method as claimed in claim 1, wherein the process data objects of the control or automation system are transmitted between the gateway device and the superordinate unit using a high-performance Ethernet, Profibus, or Profinet protocol.

4. The method as claimed in claim 1, wherein the signals are serially transmitted via the second communications link.

5. The method as claimed in claim 1, wherein the process data objects of the control or automation system are transmitted between the gateway device and the field devices connected to the latter via the CAN or CANopen field bus protocol.

6. The method as claimed in claim 1, wherein process variables provided by the field devices are transmitted as process data objects based on the secondary field bus protocol to the second functional unit of the gateway device, which operates as a CANopen task master, as so-called CAN messages.

7. A method for transmitting a process map of a control or automation system via a gateway device including at least one first functional unit, to which a superordinate control unit is connected via a first communications link based on a primary field bus protocol, and at least one second functional unit, to which at least one field device is connected via a second communications link based on a secondary field bus protocol, the method comprising:

transmitting the process variables provided by the superordinate unit as process data objects based on the primary field bus protocol to the first functional unit of the gateway device, as messages in a byte format with no overhead for each data bit which can be processed by the primary field bus protocol;

generating eight binary signals from each byte and storing the binary signals in a corresponding register address of the first functional unit;

entering the signals in integer format from the superordinate unit in a register address;

transmitting the binary signals stored in the corresponding registers, and analog signals in integer format to the second functional unit operating as a task master;

and transmitting the binary signals into corresponding messages which can be processed by the secondary field bus protocol and transmitted, together with the analog signals in integer format, to corresponding field devices based on the secondary field bus protocol.

8. The method as claimed in claim 7, wherein the process data objects of the control or automation system are transmitted between the gateway device and the superordinate unit using a high-performance Ethernet, Profibus, or Profinet protocol.

9. The method as claimed in claim 7, wherein the signals are serially transmitted via the second communications link.

10. The method as claimed in claim 7, wherein the process data objects of the control or automation system are transmitted between the gateway device and the field devices connected to the latter via the CAN or CANopen field bus protocol.

11. The method as claimed in claim 7, wherein process variables provided by the field devices are transmitted as process data objects based on the secondary field bus protocol to the second functional unit of the gateway device, which operates as a CANopen task master, as so-called CAN messages.

12. The method as claimed in claim 2, wherein the gateway device is configured to operate as a task gateway.

13. A system for transmitting a process map of a control or automation system comprising:

a gateway device including at least one first functional unit, to which a superordinate control unit is connected via a first communications link based on a primary field bus protocol, and at least one second functional unit, to which at least one field device is connected via a second communications link based on a secondary field bus protocol, wherein the second functional unit of the gateway device, which operates as a task master, receives process variables provided by the field devices as process data objects based on the secondary field bus protocol as messages, wherein registers provided in the second functional unit are allocated to the process data objects which are in the form of digital signals and are in binary format, and wherein the digital signals stored in the corresponding registers are packed as binary signals into data blocks of eight bits each with no overhead for each data bit, stored in the first functional unit operating as a task gateway, and translated into corresponding messages which can be processed by the primary field bus protocol and can be transmitted, together with analog signals in integer format, to the superordinate control unit based on the primary field bus protocol.

14. An automation control system, comprising:

a gateway device including at least one first functional unit, to which a superordinate control unit is connected via a first communications link based on a primary field bus protocol, and at least one second functional unit, to which at least one field device is connected via a second communications link based on a secondary field bus protocol, wherein the second functional unit of the gateway device, which operates as a task master, receives process variables provided by the field devices as process data objects based on the secondary field bus protocol as messages, wherein registers provided in the second functional unit are allocated to the process data objects which are in the form of digital signals and are in binary format, and wherein the digital signals stored in the corresponding registers are packed as binary signals into data blocks of eight bits each with no overhead for each data bit, stored in the first functional unit operating as a task gateway, and translated into corresponding messages which can be processed by the primary field bus protocol and can be transmitted, together with analog signals in integer format, to the superordinate control unit based on the primary field bus protocol.

15. The method as claimed in claim 12, wherein the process data objects of the control or automation system are transmitted between the gateway device and the superordinate unit using a high-performance Ethernet, Profibus, or Profinet protocol.

16. The method as claimed in claim 15, wherein the signals are serially transmitted via the second communications link.

17. The method as claimed in claim 16, wherein the process data objects of the control or automation system are transmitted between the gateway device and the field devices connected to the latter via the CAN or CANopen field bus protocol.

18. The method as claimed in claim 17, wherein process variables provided by the field devices are transmitted as process data objects based on the secondary field bus protocol to the second functional unit of the gateway device, which operates as a CANopen task master, as so-called CAN messages.

19. The method as claimed in claim 1, wherein the process data objects of the control or automation system are transmitted between the gateway device and the superordinate unit using a high-performance Ethernet, Profibus, or Profinet protocol, and wherein the process data objects of the control or automation system are transmitted between the gateway device and the field devices connected to the latter via the CAN or CANopen field bus protocol.

20. The method as claimed in claim 19, wherein process variables provided by the field devices are transmitted as process data objects based on the secondary field bus protocol to the second functional unit of the gateway device, which operates as a CANopen task master, as so-called CAN messages.

* * * * *